(12) United States Patent
Xu et al.

(10) Patent No.: US 11,899,175 B2
(45) Date of Patent: Feb. 13, 2024

(54) OPTICAL IMAGING LENS ASSEMBLY

(71) Applicant: Zhejiang Sunny Optical Co., Ltd, Ningbo (CN)

(72) Inventors: Wuchao Xu, Ningbo (CN); Kaiyuan Zhang, Ningbo (CN); Xiaofang Wang, Ningbo (CN); Ying Zhou, Ningbo (CN); Fujian Dai, Ningbo (CN); Liefeng Zhao, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 549 days.

(21) Appl. No.: 17/087,176

(22) Filed: Nov. 2, 2020

(65) Prior Publication Data
US 2021/0199926 A1 Jul. 1, 2021

(30) Foreign Application Priority Data

Dec. 30, 2019 (CN) .......................... 201911396622.X

(51) Int. Cl.
*G02B 9/64* (2006.01)
*G02B 13/00* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ... G02B 9/64; G02B 13/0045; G02B 27/0025
See application file for complete search history.

(56) References Cited

FOREIGN PATENT DOCUMENTS

| CN | 105116519 B | 11/2017 |
|---|---|---|
| CN | 208506350 U | 2/2019 |
| CN | 111856707 A | 5/2019 |
| CN | 209327659 U | 8/2019 |
| CN | 110320640 A | 10/2019 |
| CN | 110376710 A | 10/2019 |
| CN | 110456481 A | 11/2019 |
| CN | 110568596 A | 12/2019 |
| CN | 211263921 U | 8/2020 |
| JP | 2006106321 A | 4/2006 |
| JP | 2016062020 A | 4/2016 |
| JP | 2017116911 A | 6/2017 |
| JP | 2019078839 A | 5/2019 |

OTHER PUBLICATIONS

First Chinese Office Action for Application No. 202111241983.4, dated Jul. 1, 2022, 13 pages.
Office Action from Intellectual Property of India for Application No. 202014047864, dated Dec. 7, 2021, 5 pages.

*Primary Examiner* — Jack Dinh

(74) *Attorney, Agent, or Firm* — Barnes & Thornburg LLP

(57) ABSTRACT

The present disclosure discloses an optical imaging lens assembly, sequentially from an object side to an image side along an optical axis, including: a first lens having refractive power, an object-side surface thereof is concave, and an image-side surface thereof is convex; a second lens having refractive power; a third lens having refractive power; a fourth lens having refractive power; a fifth lens having negative refractive power, and an object-side surface thereof is concave; a sixth lens having positive refractive power; and a seventh lens having refractive power. A total effective focal length f of the optical imaging lens assembly and an effective focal length f3 of the third lens may satisfy $f3/f>1.49$.

20 Claims, 9 Drawing Sheets

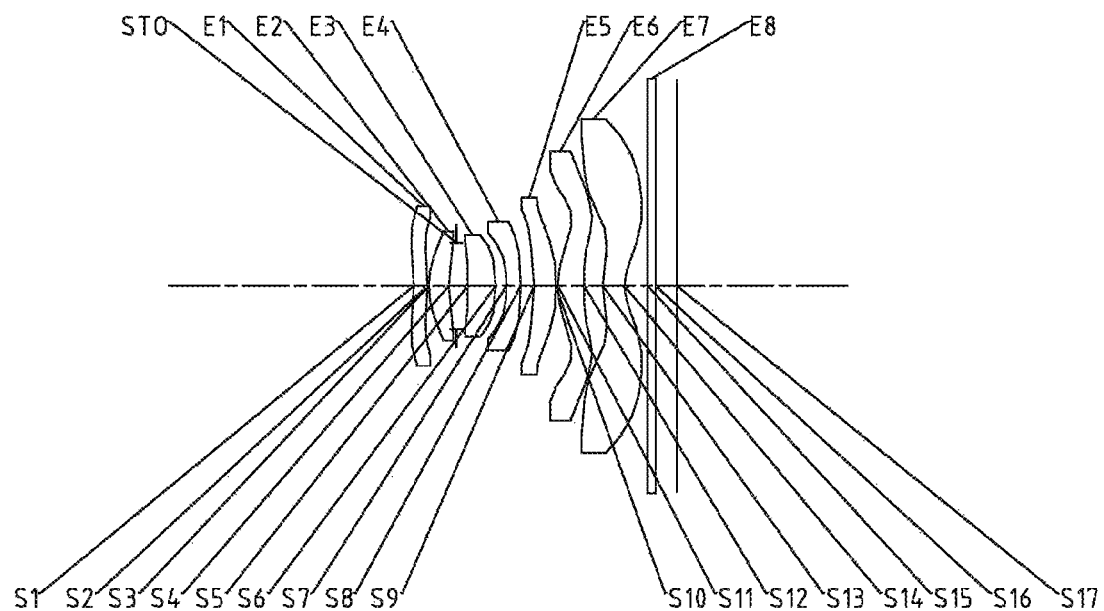
Fig. 9
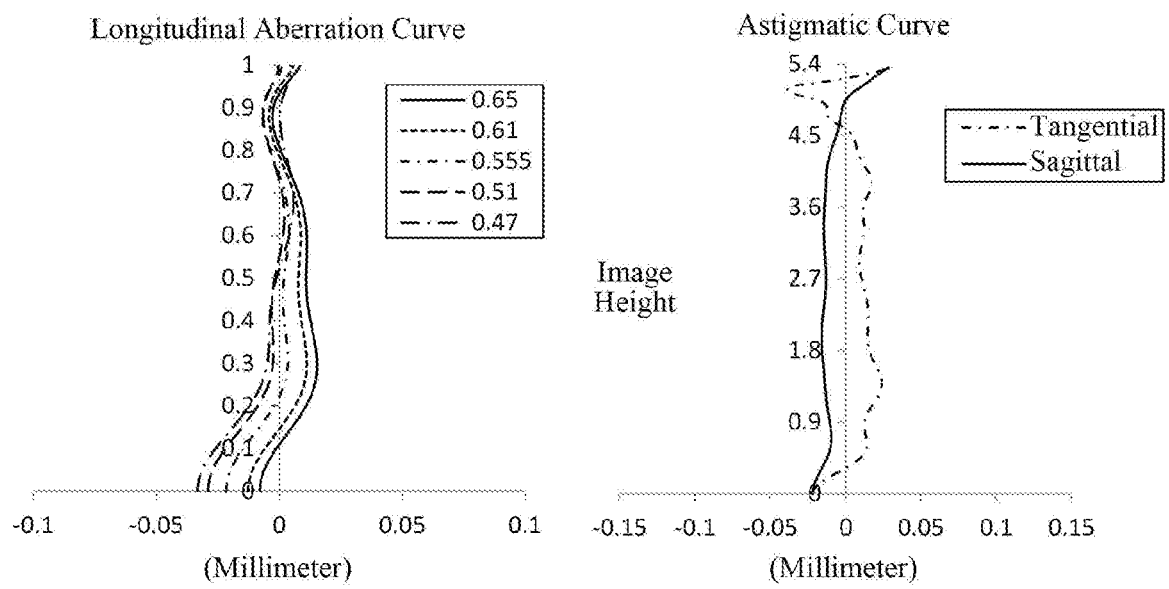
Fig. 10A
Fig. 10B

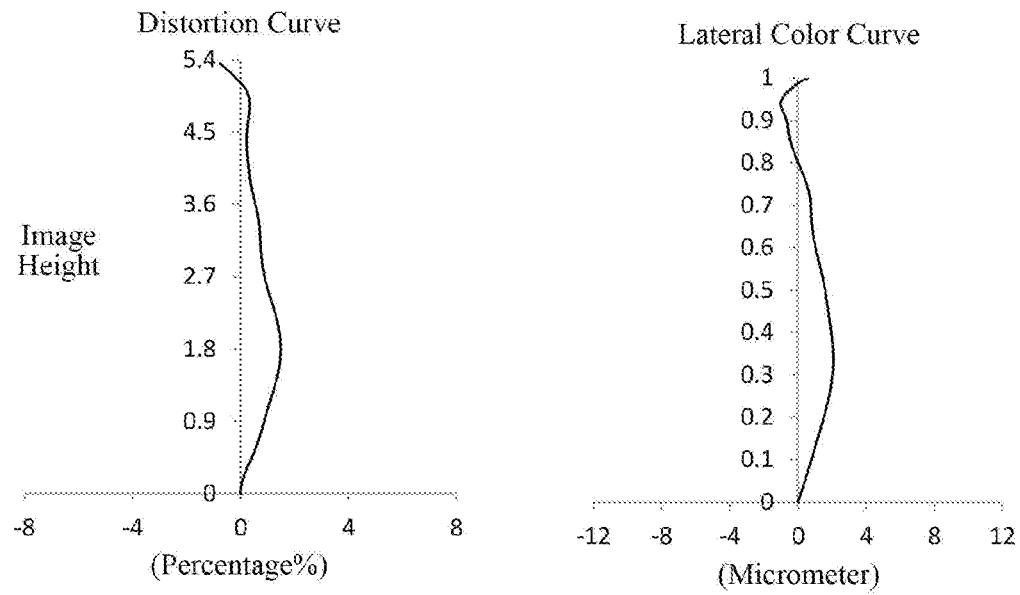
Fig. 10C
Fig. 10D
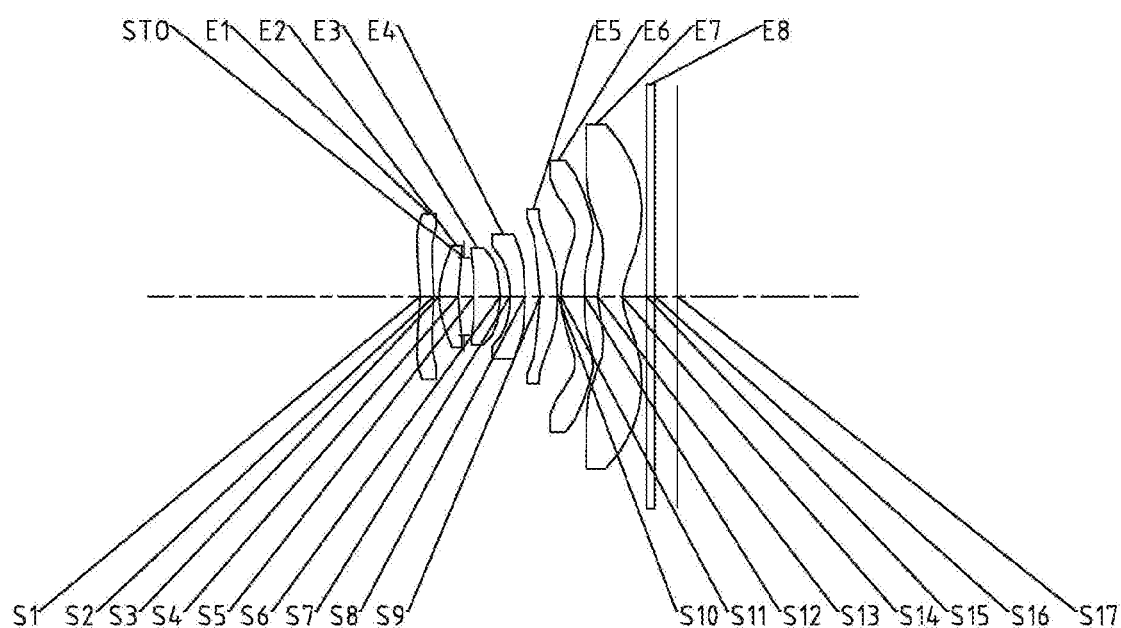
Fig. 11

OPTICAL IMAGING LENS ASSEMBLY

CROSS-REFERENCE TO RELATED APPLICATION

This application claims benefit of priority to Chinese Patent Application No. 201911396622.X filed on Dec. 30, 2019 before the China National Intellectual Property Administration, the entire disclosure of which is incorporated herein by reference in its entity.

TECHNICAL FIELD

The present disclosure relates to the field of optical elements, and more specifically, relates to an optical imaging lens assembly.

BACKGROUND

With the rapid development of portable electronic products such as smart phones, and the further optimization of the performance of image sensors such as Charge-coupled Devices (CCD) and Complementary Metal Oxide Semiconductor elements (CMOS), imaging lenses for portable electronic products such as smart phones have also ushered in a stage of rapid development. The rear dual cameras and triple cameras of portable electronic products, such as mobile phones, have gradually become popular. However, installing two or more cameras in portable electronic products poses a huge challenge to the design of the optical imaging lens assembly. For the optical imaging lens assembly, simply scaling down the size of a large lens assembly will not be able to obtain a small lens assembly with the same performance as the original large lens assembly. Therefore, a new design and processing of an optical imaging lens assembly adapted to portable electronic products are required to meet the requirements of miniaturization and high imaging quality.

SUMMARY

The present disclosure provides an optical imaging lens assembly which includes, sequentially from an object side to an image side along an optical axis, a first lens having refractive power, an object-side surface thereof is a concave surface, and an image-side surface thereof is a convex surface; a second lens having refractive power; a third lens having refractive power; a fourth lens having refractive power; a fifth lens having negative refractive power, and an object-side surface thereof is a concave surface; a sixth lens having positive refractive power; and a seventh lens having refractive power.

In one embodiment, at least one of the first to the seventh lenses includes an aspheric surface.

In one embodiment, a total effective focal length f of the optical imaging lens assembly and an effective focal length f3 of the third lens may satisfy $f3/f>1.49$.

In one embodiment, an optical distortion ODT of the optical imaging lens assembly may satisfy $|ODT|\leq 3.52$ mm.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly may satisfy $TTL/ImgH<1.47$.

In one embodiment, a radius of curvature R9 of an object-side surface of the fifth lens and an effective focal length f5 of the fifth lens may satisfy $0<R9/f5\leq 0.6$.

In one embodiment, a total effective focal length f of the optical imaging lens assembly and an effective focal length f6 of the sixth lens may satisfy $0.6<f6/f\leq 1.29$.

In one embodiment, SAG41, being a distance along the optical axis from an intersection of an object-side surface of the fourth lens and the optical axis to a vertex of an effective radius of the object-side surface of the fourth lens, and SAG42, being a distance along the optical axis from an intersection of an image-side surface of the fourth lens and the optical axis to a vertex of an effective radius of the image-side surface of the fourth lens may satisfy $0.1<SAG42/SAG41<0.9$.

In one embodiment, a center thickness CT3 of the third lens and a center thickness CT6 of the sixth lens may satisfy $0.7<CT3/CT6<1.3$.

In one embodiment, a spaced interval T12 between the first lens and the second lens along the optical axis, a spaced interval T56 between the fifth lens and the sixth lens along the optical axis, and a distance TTL along the optical axis from an object-side surface of the first lens to an imaging plane of the optical imaging lens assembly may satisfy $0.2 \text{ mm}^2 < (T12+T56)*TTL \leq 1.37 \text{ mm}^2$.

In one embodiment, a total effective focal length f of the optical imaging lens assembly and an entrance pupil diameter EPD of the optical imaging lens assembly may satisfy $f/EPD<2$.

In one embodiment, a total effective focal length f of the optical imaging lens assembly, a radius of curvature R1 of an object-side surface of the first lens, and a radius of curvature R2 of an image-side surface of the first lens may satisfy $-1<f/(R1+R2)<0$.

In one embodiment, a combined focal length f12 of the first lens and the second lens and a total effective focal length f of the optical imaging lens assembly may satisfy $1.5<f12/f<2.5$.

In one embodiment, half of a maximal field-of-view HFOV of the optical imaging lens assembly may satisfy $HFOV>45°$.

Through the above configuration, the optical imaging lens assembly according to the present disclosure may have at least one beneficial effect such as a large imaging plane, a large angle of view, ultra-thinness, small distortion, and high imaging quality.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 9 illustrates a schematic structural view of an optical imaging lens assembly according to Example 5 of the present disclosure;

FIGS. 10A to 10D illustrate a longitudinal aberration curve, an astigmatic curve, a distortion curve, and a lateral color curve of the optical imaging lens assembly of the Example 5, respectively;

FIG. 11 illustrates a schematic structural view of an optical imaging lens assembly according to Example 6 of the present disclosure.

DETAILED DESCRIPTION OF EMBODIMENTS

Figure 1:
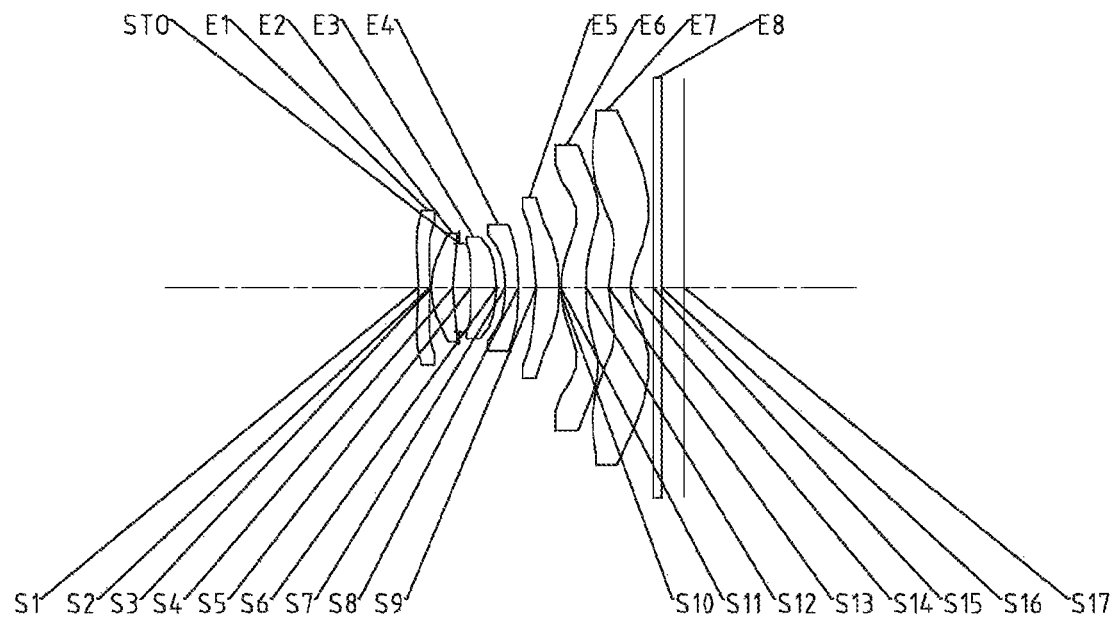
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include seven lenses, i.e. a first lens, a second lens, a third lens, a fourth lens, a fifth lens, a sixth lens and a seventh lens. Each of the first to the seventh lenses has refractive power. The seven lenses are arranged sequentially from an object side to an image side along an optical axis. Among the first lens to the seventh lens, there may be an air interval between each two adjacent lenses.

In an exemplary embodiment, the first lens has positive or negative refractive power, an object-side surface thereof may be a concave surface, and an image-side surface thereof may be a convex surface. The second lens has positive or negative refractive power. The third lens has positive or negative refractive power. The fourth lens has positive or negative refractive power. The fifth lens may have negative refractive power, and an object-side surface thereof may be concave surface. The sixth lens may have positive refractive power. The seventh lens has positive or negative refractive power.

Reasonably configuring the refractive power and surface shape of each lens can reduce the tolerance sensitivity of the lens on the basis of ensuring the performance of the lens and reducing the aberrations, so that the optical imaging lens assembly has better mass production feasibility. By configuring the first lens being concave-convex, the curvature of field of each field of view can be better compensated. By configuring the fifth lens and the sixth lens to have negative and positive refractive power, respectively, it can help to better correct the axial chromatic aberration and improve the imaging performance of the lens system.

In an exemplary embodiment, the optical imaging lens assembly according to the present disclosure may satisfy f3/f>1.49, where f is a total effective focal length of the optical imaging lens assembly, and f3 is an effective focal length of the third lens. More specifically, f3 and f may further satisfy f3/f>1.6. Satisfying f3/f>1.49 is conducive to better correcting the off-axis aberration of the lens system, so that the lens system may obtain a larger object field angle.

In an exemplary embodiment, the optical imaging lens assembly according to the present disclosure may satisfy |ODT|≤3.52 mm, where ODT is an optical distortion of the optical imaging lens assembly. Satisfying |ODT|≤3.52 mm is conducive to reducing the distortion of the optical lens assembly and avoiding image distortion due to deformation.

In an exemplary embodiment, the optical imaging lens assembly according to the present disclosure may satisfy TTL/ImgH<1.47, where TTL is a distance along the optical axis from an object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy TTL/ImgH<1.3. Satisfying TTL/ImgH<1.47 is conducive to achieving a large imaging plane and an ultra-thin optical lens assembly.

In an exemplary embodiment, the optical imaging lens assembly according to the present disclosure may satisfy 0<R9/f5≤0.6, where R9 is a radius of curvature of an object-side surface of the fifth lens, and f5 is an effective focal length of the fifth lens. Satisfying 0<R9/f5≤0.6 may effectively control the contribution of the object-side surface of the fifth lens to the astigmatic, thereby reasonably controlling the image quality in the central field-of-view aperture band.

In an exemplary embodiment, the optical imaging lens assembly according to the present disclosure may satisfy 0.6<f6/f≤1.29, where f is a total effective focal length of the optical imaging lens assembly, and f6 is an effective focal length of the sixth lens. Satisfying 0.6<f6/f≤1.29 is beneficial to the correction of the axial chromatic aberration of the optical lens assembly and improves the resolution ability of the optical lens assembly.

In an exemplary embodiment, the optical imaging lens assembly according to the present disclosure may satisfy 0.1<SAG42/SAG41<0.9, where SAG41 is a distance along the optical axis from an intersection of an object-side surface of the fourth lens and the optical axis to a vertex of an effective radius of the object-side surface of the fourth lens, and SAG42 is a distance along the optical axis from an intersection of an image-side surface of the fourth lens and the optical axis to a vertex of an effective radius of the image-side surface of the fourth lens. More specifically, SAG42 and SAG41 may further satisfy 0.4<SAG42/SAG41<0.7. Satisfying 0.1<SAG42/SAG41<0.9 is conducive to the smooth transition of the aspheric surface and the shaping thereof, thereby meeting the requirements of processability and manufacturability.

In an exemplary embodiment, the optical imaging lens assembly according to the present disclosure may satisfy 0.7<CT3/CT6<1.3, where CT3 is a center thickness of the third lens, and CT6 is a center thickness of the sixth lens. More specifically, CT3 and CT6 may further satisfy 0.9<CT3/CT6<1.2. Satisfying 0.7<CT3/CT6<1.3 is conducive to meeting the requirements for processability and manufacturability of the lens, and is conducive to correcting the field curvature and distortion of the lens system.

In an exemplary embodiment, the optical imaging lens assembly according to the present disclosure may satisfy 0.2 mm$^2$<(T12+T56)*TTL≤1.37 mm$^2$, where T12 is a spaced interval between the first lens and the second lens along the optical axis, T56 is a spaced interval between the fifth lens and the sixth lens along the optical axis, and TTL is a distance along the optical axis from an object-side surface of the first lens to an imaging plane of the optical imaging lens assembly. More specifically, T12, T56 and TTL may further satisfy 0.5 mm$^2$<(T12+T56)*TTL≤1.37 mm$^2$. Satisfying 0.2 mm$^2$<(T12+T56)*TTL≤1.37 mm$^2$ is beneficial to ensure the compact structure of the optical lens assembly, while reducing the sensitivity of the interval thickness to curvature of field, which is beneficial to improve the assembly yield of the lens assembly.

In an exemplary embodiment, the optical imaging lens assembly according to the present disclosure may satisfy f/EPD<2, where f is a total effective focal length of the optical imaging lens assembly, and EPD is an entrance pupil diameter of the optical imaging lens assembly. Satisfying f/EPD<2 is conducive to increasing the relative aperture of the optical lens assembly, improving chip responsivity, and enabling the optical imaging lens assembly to obtain better imaging performance clarity.

In an exemplary embodiment, the optical imaging lens assembly according to the present disclosure may satisfy −1<f/(R1+R2)<0, where f is a total effective focal length of the optical imaging lens assembly, R1 is a radius of curvature of an object-side surface of the first lens, and R2 is a radius of curvature of an image-side surface of the first lens. More specifically, f, R1 and R2 may further satisfy −0.6<f/(R1+R2)<−0.3. Satisfying −1<f/(R1+R2)<0 is beneficial to correct the spherical aberration and axial chromatic aberration of the optical lens assembly and improve the imaging quality.

In an exemplary embodiment, the optical imaging lens assembly according to the present disclosure may satisfy 1.5<f12/f<2.5, where f12 is a combined focal length of the first lens and the second lens, and f is a total effective focal length of the optical imaging lens assembly. More specifically, f12 and f may further satisfy 1.8<f12/f<2.3. Satisfying 1.5<f12/f<2.5 is beneficial to ensure the compact structure of the optical lens assembly, and is beneficial to obtain an optical lens assembly with large wide-angle, small distortion, and large aperture.

In an exemplary embodiment, the optical imaging lens assembly according to the present disclosure may satisfy HFOV>45°, where HFOV is half of a maximal field-of-view of the optical imaging lens assembly. More specifically, HFOV may further satisfy HFOV 49°. Satisfying HFOV>45° is beneficial for the optical imaging lens assembly to obtain a larger field-of-view and improve the ability of the optical imaging lens assembly to collect object information.

In an exemplary embodiment, the above optical imaging lens assembly may further include a stop disposed between the second lens and the third lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. The optical imaging lens assembly configured as described above may have characteristics such as large imaging plane, large wide-angle, ultra-thin, small distortion, and good imaging quality.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to Example 1 of the present disclosure is described below with reference to FIG. 1 to FIG. 2D. FIG. 1 shows a schematic structural view of the optical imaging lens assembly according to Example 1 of the present disclosure.

As shown in FIG. 1, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of Example 1, wherein the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −5.4587 | 0.2972 | 1.55 | 56.11 | −25.02 | 0.0440 |
| S2 | Aspheric | −9.2587 | 0.0400 | | | | 4.5349 |
| S3 | Aspheric | 2.0692 | 0.5523 | 1.55 | 56.11 | 6.16 | −2.3004 |
| S4 | Aspheric | 4.8554 | 0.1575 | | | | −4.0334 |
| STO | Spherical | Infinite | 0.3040 | | | | |
| S5 | Aspheric | −28.6674 | 0.6628 | 1.55 | 56.11 | 8.22 | 99.0000 |
| S6 | Aspheric | −3.9174 | 0.2226 | | | | 1.3295 |
| S7 | Aspheric | −4.7804 | 0.3397 | 1.68 | 19.24 | −11.18 | 0.5594 |
| S8 | Aspheric | −13.3244 | 0.4597 | | | | 3.1167 |
| S9 | Aspheric | −3.9300 | 0.5848 | 1.57 | 37.32 | −9.71 | −0.0905 |
| S10 | Aspheric | −14.2699 | 0.0450 | | | | 20.6962 |
| S11 | Aspheric | 2.1304 | 0.6550 | 1.55 | 56.11 | 3.90 | −9.8780 |
| S12 | Aspheric | 1282.9409 | 0.5734 | | | | 0.0000 |
| S13 | Aspheric | 2.0995 | 0.5600 | 1.54 | 55.87 | −6.41 | −6.2892 |
| S14 | Aspheric | 1.1821 | 0.5972 | | | | −3.0261 |
| S15 | Aspheric | Infinite | 0.2100 | 1.52 | 64.17 | | |
| S16 | Aspheric | Infinite | 0.5822 | | | | |
| S17 | Spherical | Infinite | Infinite | | | | |

In the present example, a total effective focal length f of the optical imaging lens assembly is 4.45 mm, a total length TTL of the optical imaging lens assembly (i.e., a distance along the optical axis from the object-side surface S1 of the first lens E1 to the imaging plane S17 of the optical imaging lens assembly) is 6.84 mm, half of a diagonal length ImgH of an effective pixel area on the imaging plane S17 of the optical imaging lens assembly is 5.35 mm, half of a maximal field-of-view HFOV of the optical imaging lens assembly is 51.13°, and an F-number Fno of the optical imaging lens assembly is 1.88.

In Example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in Example 1.

Example 2

Figure 3:
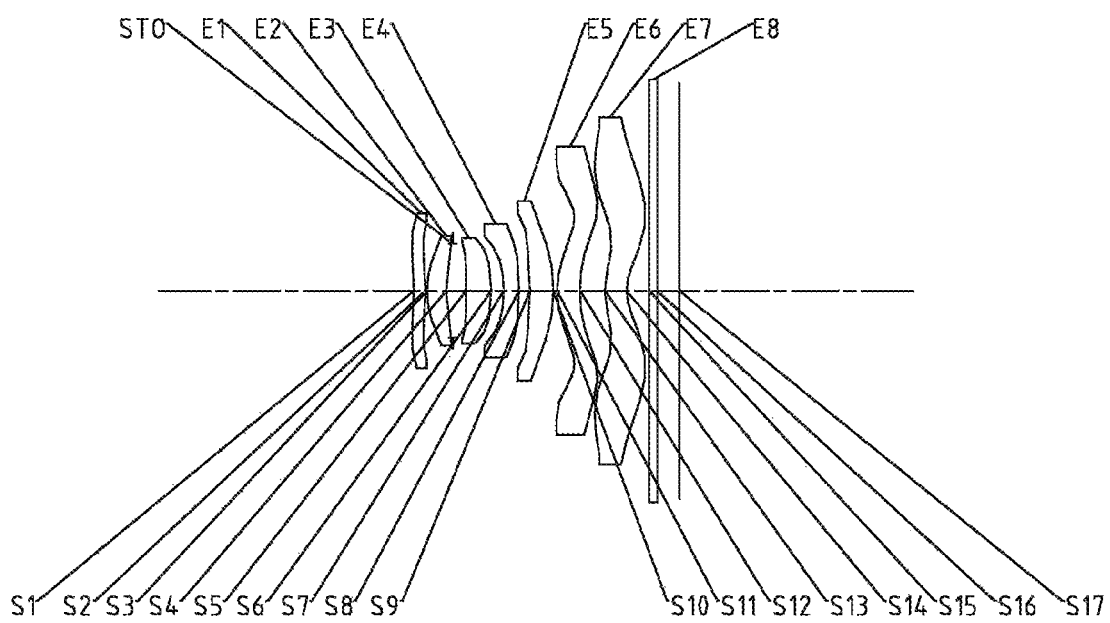
FIG. 3 illustrates a schematic structural view of an optical imaging lens assembly according to Example 2 of the present disclosure.

An optical imaging lens assembly according to Example 2 of the present disclosure is described below with reference to FIG. 3 to FIG. 4D. In this example and the following examples, for the purpose of brevity, the description of parts similar to those in Example 1 will be omitted. FIG. 3 shows a schematic structural view of the optical imaging lens assembly according to Example 2 of the present disclosure.

As shown in FIG. 3, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side

TABLE 2

| Surface number | A4 | A6 | A8 | A10 | A12 | A14 | A16 | A18 | A20 |
|---|---|---|---|---|---|---|---|---|---|
| S1 | 7.1395E−02 | −5.1448E−02 | 4.3882E−02 | −2.8442E−02 | 1.2841E−02 | −3.8448E−03 | 7.2585E−04 | −7.8167E−05 | 3.6543E−06 |
| S2 | 4.0862E−02 | −1.0788E−02 | 1.0588E−02 | −1.0504E−02 | 7.0852E−03 | −2.8451E−03 | 6.6980E−04 | −8.5060E−05 | 4.3597E−06 |
| S3 | −2.0615E−02 | 7.1187E−02 | −1.2595E−01 | 1.7396E−01 | −1.7115E−01 | 1.1091E−01 | −4.4107E−02 | 9.5469E−03 | −8.4554E−04 |
| S4 | −1.7503E−02 | −5.2315E−03 | 5.2031E−02 | −1.4439E−01 | 2.1095E−01 | −1.8567E−01 | 9.7997E−02 | −2.8565E−02 | 3.5359E−03 |
| S5 | −2.4437E−02 | 3.0787E−03 | −9.3013E−02 | 3.3153E−01 | −6.9119E−01 | 8.6009E−01 | −6.3393E−01 | 2.5424E−01 | −4.2742E−02 |
| S6 | −5.2146E−02 | −5.8099E−03 | −2.7484E−02 | 1.1021E−01 | −1.8431E−01 | 1.7627E−01 | −1.0148E−01 | 3.2563E−02 | −4.4747E−03 |
| S7 | −8.1916E−02 | 1.6617E−02 | −1.4310E−01 | 3.3238E−01 | −3.9126E−01 | 2.8101E−01 | −1.2635E−01 | 3.3096E−02 | −3.8568E−03 |
| S8 | −1.4543E−02 | −2.2023E−02 | −2.7087E−03 | 2.4617E−02 | −2.1592E−02 | 9.3127E−03 | −2.2221E−03 | 2.9735E−04 | −1.8299E−05 |
| S9 | 5.2048E−02 | 3.9312E−03 | −2.3997E−02 | 1.2827E−02 | −2.0690E−03 | −7.1335E−04 | 3.9082E−04 | −6.7230E−05 | 4.1044E−06 |
| S10 | −1.4902E−01 | 1.3172E−01 | −8.8110E−02 | 4.3192E−02 | −1.4785E−02 | 3.3914E−03 | −4.8813E−04 | 3.9393E−05 | −1.3529E−06 |
| S11 | 4.8851E−02 | −1.9047E−02 | −2.5370E−03 | 2.9635E−03 | −8.9140E−04 | 1.4274E−04 | −1.2898E−05 | 6.1889E−07 | −1.2285E−08 |
| S12 | 1.5490E−01 | −8.7202E−02 | 2.6124E−02 | −5.1378E−03 | 6.7266E−04 | −5.7090E−05 | 2.9879E−06 | −8.7070E−08 | 1.0751E−09 |
| S13 | −5.9212E−02 | −1.1444E−03 | 3.3468E−03 | −6.6778E−04 | 6.7586E−05 | −4.0677E−06 | 1.4763E−07 | −2.9959E−09 | 2.6178E−11 |
| S14 | −6.0285E−02 | 1.5669E−02 | −3.3071E−03 | 5.1167E−04 | −5.2508E−05 | 3.4125E−06 | −1.3447E−07 | 2.9293E−09 | −2.7073E−11 |

Figures 2A, 2B:
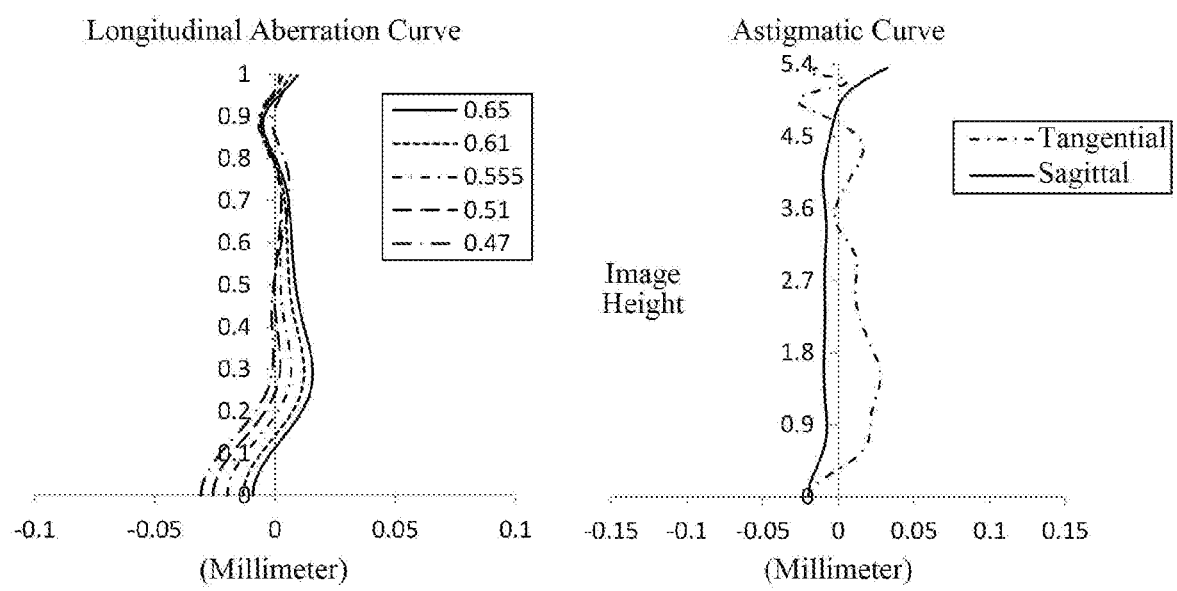
FIGS. 2A to 2D illustrate a longitudinal aberration curve, an astigmatic curve, a distortion curve, and a lateral color curve of the optical imaging lens assembly of the Example 1, respectively.
Figure 2C:
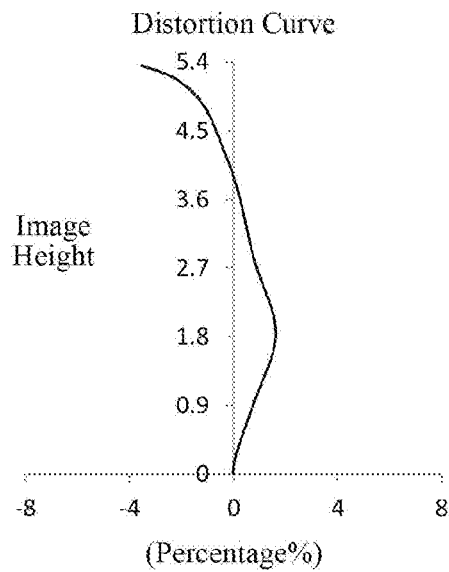
Figure 2D:
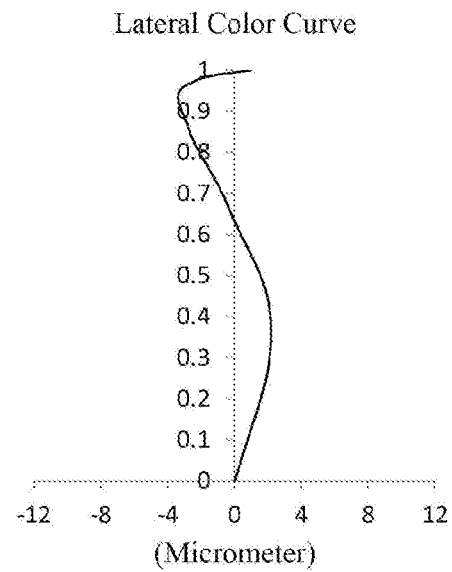

FIG. 2A illustrates a longitudinal aberration curve of the optical imaging lens assembly according to Example 1, representing deviations of focal points converged by light of different wavelengths after passing through the lens assembly. FIG. 2B illustrates an astigmatic curve of the optical imaging lens assembly according to Example 1, representing a curvature of a tangential plane and a curvature of a sagittal plane. FIG. 2C illustrates a distortion curve of the optical imaging lens assembly according to Example 1, representing amounts of distortion corresponding to different image heights. FIG. 2D illustrates a lateral color curve of the optical imaging lens assembly according to Example 1, representing deviations of different image heights on an imaging plane after light passes through the lens assembly. It can be seen from FIG. 2A to FIG. 2D that the optical imaging lens assembly provided in Example 1 may achieve good image quality.

surface S12 thereof is a concave surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In the present example, a total effective focal length f of the optical imaging lens assembly is 4.51 mm, a total length TTL of the optical imaging lens assembly is 6.84 mm, half of a diagonal length ImgH of an effective pixel area on the imaging plane S17 of the optical imaging lens assembly is 5.35 mm, half of a maximal field-of-view HFOV of the optical imaging lens assembly is 49.48°, and an F-number Fno of the optical imaging lens assembly is 1.79.

Table 3 is a table illustrating basic parameters of the optical imaging lens assembly of Example 2, wherein the units for the radius of curvature, the thickness/distance and the focal length are millimeter (mm). Table 4 shows high-order coefficients applicable to each aspheric surface in Example 2, wherein the surface shape of each aspheric surface may be defined by the formula (1) given in the above Example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −6.7546 | 0.2998 | 1.55 | 56.11 | 49.03 | 2.1283 |
| S2 | Aspheric | −5.4797 | 0.0400 | | | | 2.0787 |
| S3 | Aspheric | 2.4234 | 0.4942 | 1.55 | 56.11 | 10.68 | −2.6454 |
| S4 | Aspheric | 3.8443 | 0.1675 | | | | −6.4124 |
| STO | Spherical | Infinite | 0.3399 | | | | |
| S5 | Aspheric | 84.7083 | 0.6551 | 1.55 | 56.11 | 9.03 | 77.9588 |
| S6 | Aspheric | −5.2295 | 0.3196 | | | | 2.4180 |
| S7 | Aspheric | −4.3573 | 0.3961 | 1.68 | 19.24 | −10.01 | −0.6158 |
| S8 | Aspheric | −12.6312 | 0.2799 | | | | 30.3072 |
| S9 | Aspheric | −7.3484 | 0.5995 | 1.57 | 37.32 | −81.73 | 4.9075 |
| S10 | Aspheric | −8.9820 | 0.1024 | | | | 4.2681 |
| S11 | Aspheric | 2.4371 | 0.5934 | 1.55 | 56.11 | 5.84 | −7.8203 |
| S12 | Aspheric | 9.4014 | 0.6376 | | | | 0.0000 |
| S13 | Aspheric | 1.8965 | 0.5600 | 1.54 | 55.87 | −8.06 | −5.9148 |
| S14 | Aspheric | 1.1827 | 0.5822 | | | | −2.9341 |
| S15 | Aspheric | Infinite | 0.2100 | 1.52 | 64.17 | | |
| S16 | Aspheric | Infinite | 0.5675 | | | | |
| S17 | Spherical | Infinite | Infinite | | | | |

TABLE 4

| Surface number | A4 | A6 | A8 | A10 | A12 | A14 | A16 | A18 | A20 |
|---|---|---|---|---|---|---|---|---|---|
| S1 | 3.9170E−02 | −1.2775E−02 | 3.7878E−03 | 1.7222E−03 | −2.2329E−03 | 1.0104E−03 | −2.4185E−04 | 3.0288E−05 | −1.5650E−06 |
| S2 | 5.5038E−02 | −3.2476E−02 | 2.9241E−02 | −1.8929E−02 | 8.6915E−03 | −2.7447E−03 | 5.7563E−04 | −7.3617E−05 | 4.3860E−06 |
| S3 | 7.2124E−03 | 1.0426E−02 | −4.6194E−02 | 8.5537E−02 | −9.1833E−02 | 5.9143E−02 | −2.2644E−02 | 4.6766E−03 | −3.8868E−04 |
| S4 | −2.6697E−02 | 2.0967E−02 | −4.7807E−02 | 9.8914E−02 | −1.5175E−01 | 1.4836E−01 | −8.7434E−02 | 2.8326E−02 | −3.8569E−03 |
| S5 | −2.4568E−02 | −1.1198E−03 | −4.0930E−02 | 1.1479E−01 | −1.9128E−01 | 1.9108E−01 | −1.1403E−01 | 3.7297E−02 | −5.1649E−03 |
| S6 | −4.5493E−02 | −3.4835E−02 | 8.6551E−02 | −1.7031E−01 | 2.2015E−01 | −1.7842E−01 | 8.6927E−02 | −2.3356E−02 | 2.6544E−03 |
| S7 | −8.9449E−02 | 4.9823E−02 | −1.6933E−01 | 2.8055E−01 | −2.6205E−01 | 1.5850E−01 | −6.2761E−02 | 1.4791E−02 | −1.5474E−03 |
| S8 | −5.1505E−02 | 9.2707E−02 | −1.7204E−01 | 1.7752E−01 | −1.1278E−01 | 4.5986E−02 | −1.1829E−02 | 1.7559E−03 | −1.1392E−04 |
| S9 | −3.8548E−02 | 1.6705E−01 | −2.0709E−01 | 1.4852E−01 | −6.9678E−02 | 2.1689E−02 | −4.3535E−03 | 5.1220E−04 | −2.6737E−05 |
| S10 | −1.3531E−01 | 1.3451E−01 | −8.7132E−02 | 3.8721E−02 | −1.1209E−02 | 1.9366E−03 | −1.6948E−04 | 3.9393E−06 | 2.1866E−07 |
| S11 | 5.3728E−02 | −2.2127E−02 | −2.0489E−03 | 2.9469E−03 | −7.9056E−04 | 7.8841E−05 | 4.6798E−06 | −2.0987E−06 | 2.4003E−07 |
| S12 | 1.3784E−01 | −8.0561E−02 | 2.3057E−02 | −3.7812E−03 | 2.4926E−04 | 3.2949E−05 | −1.0285E−05 | 1.2726E−06 | −9.3785E−08 |
| S13 | −5.6630E−02 | −2.8674E−05 | 3.6776E−03 | −1.1666E−03 | 2.3830E−04 | −3.5373E−05 | 3.7524E−06 | −2.7702E−07 | 1.3821E−08 |
| S14 | −6.6098E−02 | 2.0986E−02 | −6.0217E−03 | 1.3904E−03 | −2.4746E−04 | 3.3416E−05 | −3.3276E−06 | 2.3585E−07 | −1.1424E−08 |

Figure 4A:
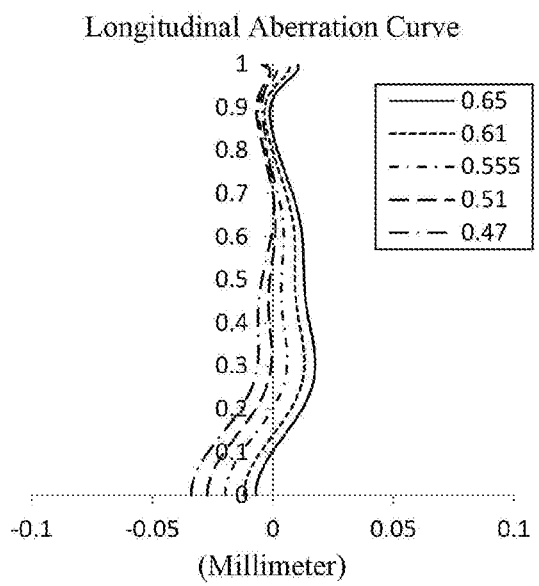
FIGS. 4A to 4D illustrate a longitudinal aberration curve, an astigmatic curve, a distortion curve, and a lateral color curve of the optical imaging lens assembly of the Example 2, respectively.
Figure 4B:
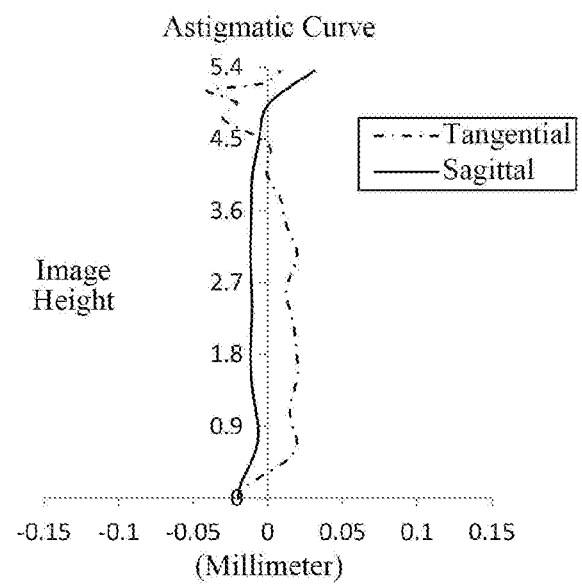
Figure 4C:
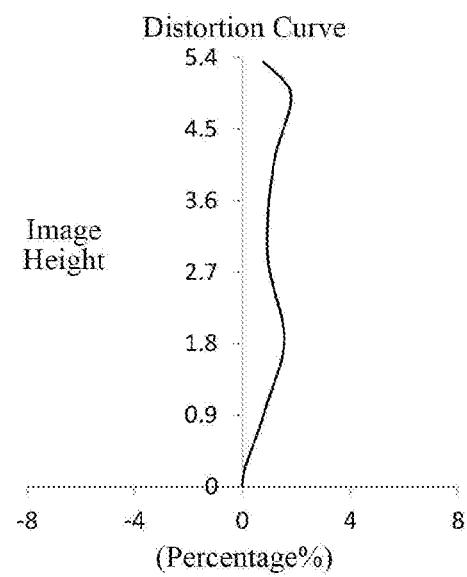
Figure 4D:
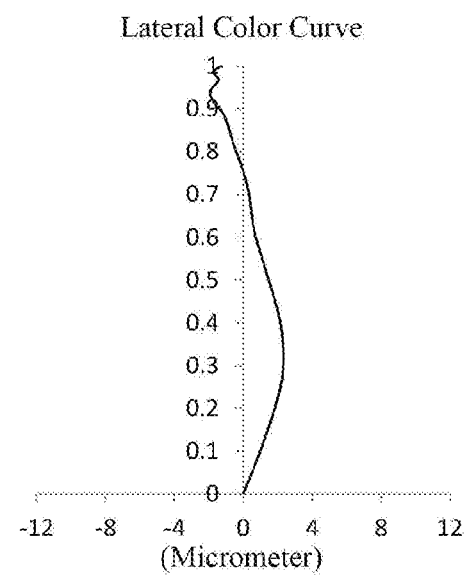

FIG. 4A illustrates a longitudinal aberration curve of the optical imaging lens assembly according to Example 2, representing deviations of focal points converged by light of different wavelengths after passing through the lens assembly. FIG. 4B illustrates an astigmatic curve of the optical imaging lens assembly according to Example 2, representing a curvature of a tangential plane and a curvature of a sagittal plane. FIG. 4C illustrates a distortion curve of the optical imaging lens assembly according to Example 2, representing amounts of distortion corresponding to different image heights. FIG. 4D illustrates a lateral color curve of the optical imaging lens assembly according to Example 2, representing deviations of different image heights on an imaging plane after light passes through the lens assembly. It can be seen from FIG. 4A to FIG. 4D that the optical imaging lens assembly provided in Example 2 may achieve good image quality.

Example 3

Figure 5:
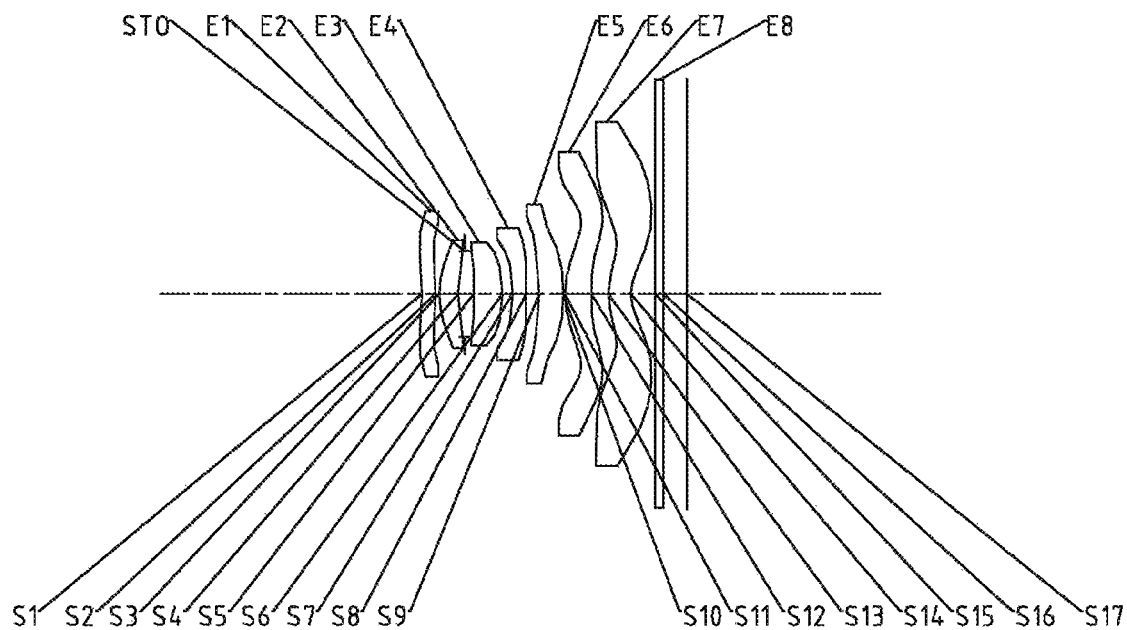
FIG. 5 illustrates a schematic structural view of an optical imaging lens assembly according to Example 3 of the present disclosure.

An optical imaging lens assembly according to Example 3 of the present disclosure is described below with reference to FIG. 5 to FIG. 6D. FIG. 5 shows a schematic structural view of the optical imaging lens assembly according to Example 3 of the present disclosure.

As shown in FIG. 5, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has positive refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a concave surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In the present example, a total effective focal length f of the optical imaging lens assembly is 4.14 mm, a total length TTL of the optical imaging lens assembly is 6.73 mm, half of a diagonal length ImgH of an effective pixel area on the imaging plane S17 of the optical imaging lens assembly is 5.35 mm, half of a maximal field-of-view HFOV of the optical imaging lens assembly is 52.77°, and an F-number Fno of the optical imaging lens assembly is 1.85.

Table 5 is a table illustrating basic parameters of the optical imaging lens assembly of Example 3, wherein the units for the radius of curvature, the thickness/distance and the focal length are millimeter (mm). Table 6 shows high-order coefficients applicable to each aspheric surface in Example 3, wherein the surface shape of each aspheric surface may be defined by the formula (1) given in the above Example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −5.6988 | 0.3454 | 1.55 | 56.11 | 209.41 | 0.7587 |
| S2 | Aspheric | −5.5448 | 0.0971 | | | | 0.9483 |
| S3 | Aspheric | 2.3446 | 0.4755 | 1.55 | 56.11 | 10.14 | −2.6426 |
| S4 | Aspheric | 3.7711 | 0.1648 | | | | −6.0548 |
| STO | Spherical | Infinite | 0.2321 | | | | |
| S5 | Aspheric | 48.2374 | 0.7282 | 1.55 | 56.11 | 7.05 | 99.0000 |
| S6 | Aspheric | −4.1633 | 0.2568 | | | | 1.1694 |
| S7 | Aspheric | −7.3088 | 0.3489 | 1.68 | 19.24 | −9.90 | 1.2296 |
| S8 | Aspheric | 83.3333 | 0.3263 | | | | −41.6674 |
| S9 | Aspheric | −4.1287 | 0.6075 | 1.57 | 37.32 | −10.40 | 0.0494 |
| S10 | Aspheric | −14.3195 | 0.0465 | | | | 14.8199 |
| S11 | Aspheric | 2.2253 | 0.6714 | 1.55 | 56.11 | 4.04 | −10.3634 |
| S12 | Aspheric | −286.6945 | 0.4264 | | | | 0.0000 |
| S13 | Aspheric | 1.5627 | 0.5733 | 1.54 | 55.87 | −8.80 | −5.6837 |
| S14 | Aspheric | 1.0237 | 0.6152 | | | | −2.7358 |
| S15 | Aspheric | Infinite | 0.2100 | 1.52 | 64.17 | | |
| S16 | Aspheric | Infinite | 0.6010 | | | | |
| S17 | Spherical | Infinite | Infinite | | | | |

TABLE 6

| Surface number | A4 | A6 | A8 | A10 | A12 | A14 | A16 | A18 | A20 |
|---|---|---|---|---|---|---|---|---|---|
| S1 | 4.7779E−02 | −1.6233E−02 | 7.2814E−03 | −3.1738E−03 | 1.4458E−03 | −5.3408E−04 | 1.2817E−04 | −1.6985E−05 | 9.2889E−07 |
| S2 | 6.4043E−02 | −3.0902E−02 | 1.7165E−02 | −7.6915E−03 | 4.2925E−03 | −2.4944E−03 | 9.6023E−04 | −1.9505E−04 | 1.5777E−05 |
| S3 | 1.8855E−03 | 8.8062E−02 | −3.3986E−01 | 6.8929E−01 | −8.5621E−01 | 6.6253E−01 | −3.1091E−01 | 8.0700E−02 | −8.8641E−03 |
| S4 | −2.1063E−02 | 5.4088E−02 | −7.4168E−04 | −7.7375E−04 | −3.2345E−01 | 6.5390E−01 | −5.5672E−01 | 2.2651E−01 | −3.5725E−02 |
| S5 | −2.7076E−02 | 2.8441E−02 | −1.7403E−01 | 4.6434E−01 | −8.2443E−01 | 9.6938E−01 | −7.2262E−01 | 3.0484E−01 | −5.4972E−02 |
| S6 | −5.4693E−02 | 1.2730E−02 | −1.2554E−01 | 3.9279E−01 | −6.3222E−01 | 5.8792E−01 | −3.2095E−01 | 9.5574E−02 | −1.2010E−02 |
| S7 | −6.3812E−02 | −1.4276E−01 | 2.7067E−01 | −2.7366E−01 | 1.7622E−01 | −6.3758E−02 | 5.3962E−03 | 4.0516E−03 | −9.9651E−04 |
| S8 | −7.8035E−03 | −5.4135E−02 | 1.9371E−02 | 4.6459E−02 | −6.5727E−02 | 4.0147E−02 | −1.3484E−02 | 2.4271E−03 | −1.8140E−04 |
| S9 | 4.8866E−02 | 5.4691E−02 | −1.3951E−01 | 1.3344E−01 | −7.4502E−02 | 2.6196E−02 | −5.7730E−03 | 7.3171E−04 | −4.0560E−05 |
| S10 | −1.5329E−01 | 1.5264E−01 | −1.2725E−01 | 7.1282E−02 | −2.5296E−02 | 5.7187E−03 | −8.0178E−04 | 6.3465E−05 | −2.1616E−06 |
| S11 | 6.6029E−02 | −3.5726E−02 | 1.4431E−02 | −1.2757E−02 | 7.9347E−03 | −2.8599E−03 | 6.3694E−04 | −9.1292E−05 | 8.4795E−06 |
| S12 | 1.4441E−01 | −5.7091E−02 | −8.0432E−03 | 6.6295E−03 | −2.3312E−03 | 4.2624E−04 | −4.7438E−05 | 3.3040E−06 | −1.3918E−07 |
| S13 | −4.8383E−02 | −3.9709E−03 | 6.8782E−04 | 1.1678E−03 | −4.6387E−04 | 8.6699E−05 | −9.9067E−06 | 7.4267E−07 | −3.6888E−08 |
| S14 | −8.5718E−02 | 4.1400E−02 | −1.8603E−02 | 5.9922E−03 | −1.2934E−03 | 1.8861E−04 | −1.8812E−05 | 1.2840E−06 | −5.8931E−08 |

Figure 6A:
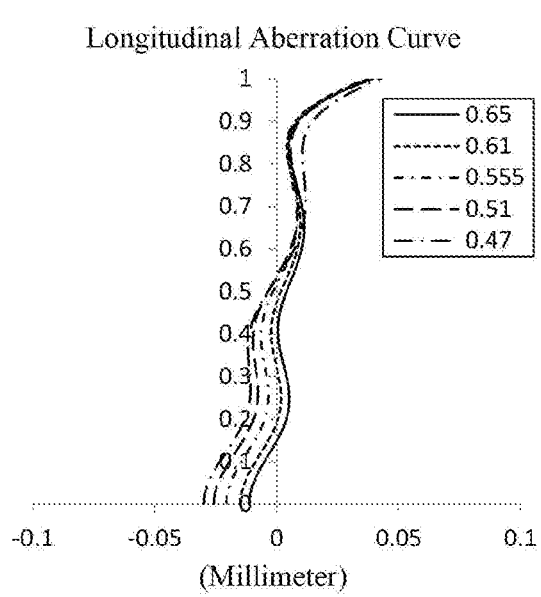
FIGS. 6A to 6D illustrate a longitudinal aberration curve, an astigmatic curve, a distortion curve, and a lateral color curve of the optical imaging lens assembly of the Example 3, respectively.
Figure 6B:
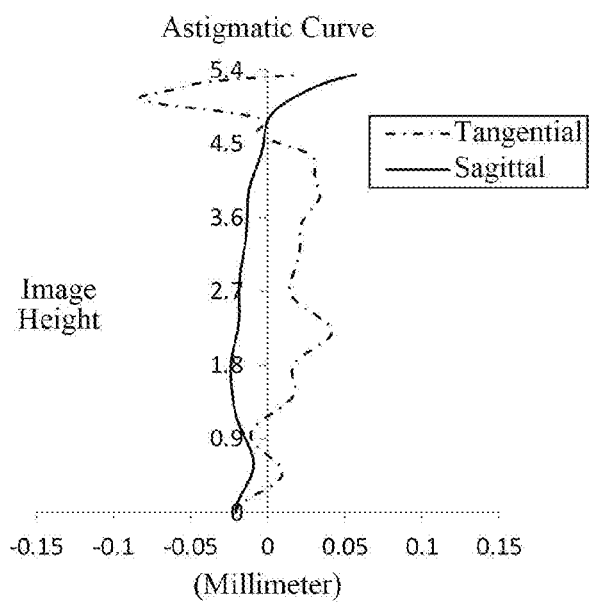
Figure 6C:
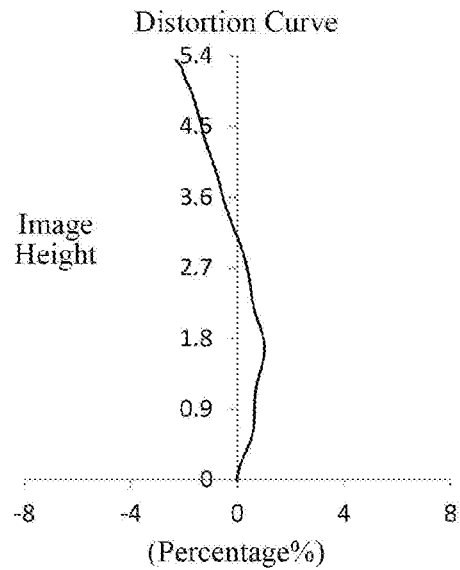
Figure 6D:
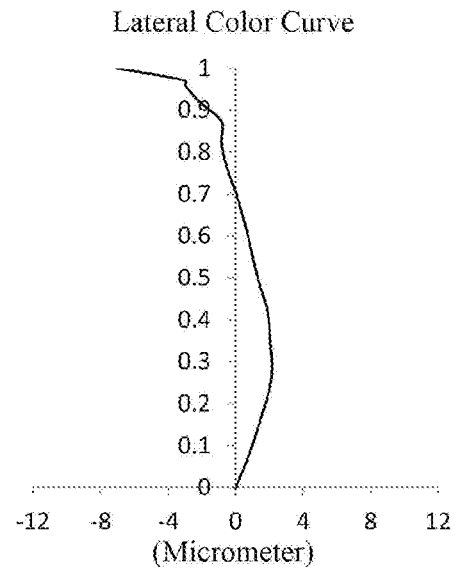

FIG. 6A illustrates a longitudinal aberration curve of the optical imaging lens assembly according to Example 3, representing deviations of focal points converged by light of different wavelengths after passing through the lens assembly. FIG. 6B illustrates an astigmatic curve of the optical imaging lens assembly according to Example 3, representing a curvature of a tangential plane and a curvature of a sagittal plane. FIG. 6C illustrates a distortion curve of the optical imaging lens assembly according to Example 3, representing amounts of distortion corresponding to different image heights. FIG. 6D illustrates a lateral color curve of the optical imaging lens assembly according to Example 3, representing deviations of different image heights on an imaging plane after light passes through the lens assembly. It can be seen from FIG. 6A to FIG. 6D that the optical imaging lens assembly provided in Example 3 may achieve good image quality.

Example 4

Figure 7:
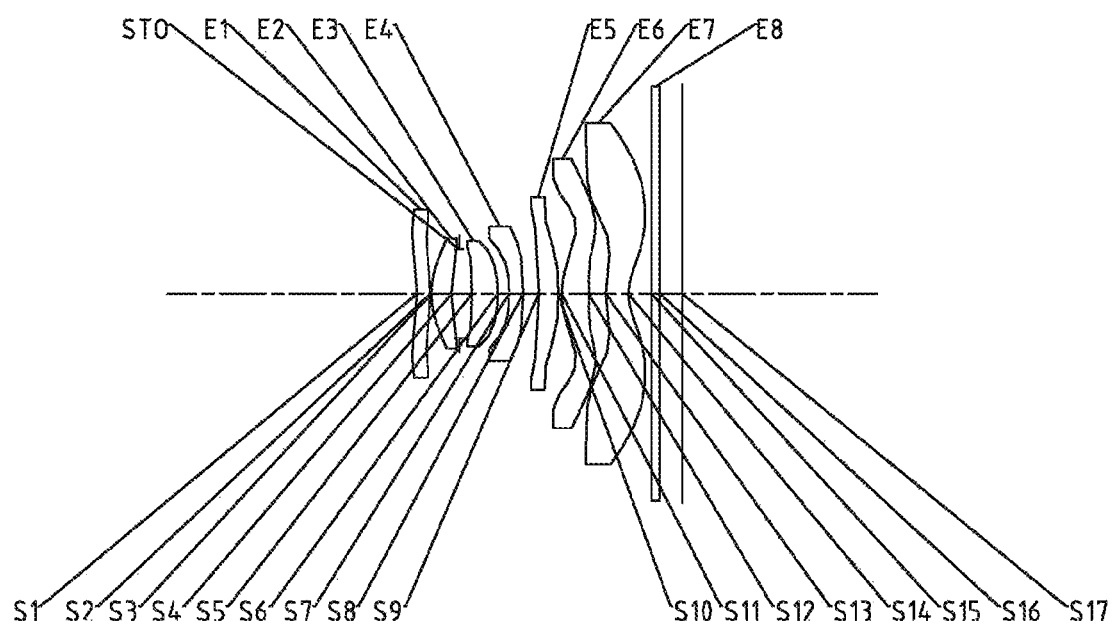
FIG. 7 illustrates a schematic structural view of an optical imaging lens assembly according to Example 4 of the present disclosure.

An optical imaging lens assembly according to Example 4 of the present disclosure is described below with reference to FIG. 7 to FIG. 8D. FIG. 7 shows a schematic structural view of the optical imaging lens assembly according to Example 4 of the present disclosure.

As shown in FIG. 7, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In the present example, a total effective focal length f of the optical imaging lens assembly is 4.42 mm, a total length TTL of the optical imaging lens assembly is 6.83 mm, half of a diagonal length ImgH of an effective pixel area on the imaging plane S17 of the optical imaging lens assembly is 5.35 mm, half of a maximal field-of-view HFOV of the optical imaging lens assembly is 50.89°, and an F-number Fno of the optical imaging lens assembly is 1.87.

Table 7 is a table illustrating basic parameters of the optical imaging lens assembly of Example 4, wherein the units for the radius of curvature, the thickness/distance and the focal length are millimeter (mm). Table 8 shows high-order coefficients applicable to each aspheric surface in Example 4, wherein the surface shape of each aspheric surface may be defined by the formula (1) given in the above Example 1.

TABLE 7

| Surface number | Surface type | Radius of curvature | Thickness/ Distance | Material Refractive index | Abbe number | Focal length | Conic coefficient |
| --- | --- | --- | --- | --- | --- | --- | --- |
| OBJ | Spherical | Infinite | Infinite | | | | |
| S1 | Aspheric | −4.2104 | 0.3469 | 1.55 | 56.11 | −1026.16 | 0.9037 |
| S2 | Aspheric | −4.3658 | 0.0250 | | | | 2.3462 |
| S3 | Aspheric | 2.2520 | 0.5179 | 1.55 | 56.11 | 8.46 | −2.4428 |
| S4 | Aspheric | 4.0341 | 0.1951 | | | | −4.4631 |
| STO | Spherical | Infinite | 0.3257 | | | | |
| S5 | Aspheric | −48.5593 | 0.6657 | 1.55 | 56.11 | 8.13 | −36.3884 |
| S6 | Aspheric | −4.0927 | 0.2976 | | | | 2.3221 |
| S7 | Aspheric | −5.3268 | 0.3618 | 1.68 | 19.24 | −10.45 | 5.5359 |
| S8 | Aspheric | −22.0670 | 0.3995 | | | | −28.1052 |
| S9 | Aspheric | −5.3034 | 0.4976 | 1.57 | 37.32 | −8.84 | −2.4371 |
| S10 | Aspheric | 105.5162 | 0.0987 | | | | 99.0000 |
| S11 | Aspheric | 2.1745 | 0.6928 | 1.55 | 56.11 | 3.22 | −10.5592 |
| S12 | Aspheric | −8.1395 | 0.4365 | | | | 0.3200 |
| S13 | Aspheric | 2.7136 | 0.5826 | 1.54 | 55.87 | −4.77 | −17.9001 |
| S14 | Aspheric | 1.2188 | 0.5959 | | | | −1.0035 |
| S15 | Aspheric | Infinite | 0.2100 | 1.52 | 64.17 | | |
| S16 | Aspheric | Infinite | 0.5847 | | | | |
| S17 | Spherical | Infinite | Infinite | | | | |

TABLE 8

| Surface number | A4 | A6 | A8 | A10 | A12 | A14 | A16 | A18 | A20 |
|---|---|---|---|---|---|---|---|---|---|
| S1 | 5.6979E−02 | −3.1587E−02 | 2.2253E−02 | −1.1858E−02 | 4.4341E−03 | −1.1048E−03 | 1.7330E−04 | −1.5421E−05 | 5.9169E−07 |
| S2 | 5.9214E−02 | −3.5528E−02 | 3.5146E−02 | −2.6523E−02 | 1.3905E−02 | −4.7822E−03 | 1.0237E−03 | −1.2338E−04 | 6.3848E−06 |
| S3 | −1.1667E−03 | 2.8221E−02 | −7.2221E−02 | 1.2477E−01 | −1.4065E−01 | 1.0017E−01 | −4.3804E−02 | 1.0664E−02 | −1.0992E−03 |
| S4 | −2.9582E−02 | 2.4903E−02 | −3.5409E−02 | 4.8109E−02 | −6.4551E−02 | 6.3339E−02 | −4.0063E−02 | 1.4496E−02 | −2.2553E−03 |
| S5 | −2.8201E−02 | 2.3990E−02 | −1.9824E−01 | 6.1589E−01 | −1.1456E+00 | 1.2960E+00 | −8.7886E−01 | 3.2767E−01 | −5.1696E−02 |
| S6 | −5.7268E−02 | −9.0396E−03 | 3.6732E−04 | 5.1372E−02 | −1.2036E−01 | 1.3532E−01 | −8.5432E−02 | 2.8758E−02 | −4.0365E−03 |
| S7 | −1.0332E−01 | −9.2501E−03 | −1.1228E−02 | 6.8653E−02 | −7.2511E−02 | 4.2003E−02 | −1.6663E−02 | 4.5389E−03 | −6.0267E−04 |
| S8 | −3.1087E−02 | −3.7260E−02 | 4.1210E−02 | −2.7483E−02 | 1.5639E−02 | −7.1764E−03 | 2.1937E−03 | −3.6978E−04 | 2.6024E−05 |
| S9 | 5.1317E−02 | −1.2304E−02 | −3.2795E−03 | 2.8450E−03 | −7.6167E−04 | 7.8081E−05 | 4.5852E−06 | −1.8084E−06 | 1.2358E−07 |
| S10 | −1.1544E−01 | 2.1471E−02 | 3.1852E−02 | −2.7606E−02 | 1.0961E−02 | −2.5062E−03 | 3.3697E−04 | −2.4826E−05 | 7.7582E−07 |
| S11 | 1.0775E−01 | −1.4242E−01 | 1.3780E−01 | −1.1026E−01 | 6.4686E−02 | −2.7138E−02 | 8.1846E−03 | −1.7877E−03 | 2.8305E−04 |
| S12 | 1.9919E−01 | −1.0219E−01 | 2.1337E−02 | −1.9997E−03 | 1.5853E−03 | −1.3863E−03 | 5.6895E−04 | −1.3751E−04 | 2.1510E−05 |
| S13 | 5.5990E−03 | −1.0709E−01 | 1.0563E−01 | −6.0030E−02 | 2.1964E−02 | −5.4173E−03 | 9.3220E−04 | −1.1436E−04 | 1.0087E−05 |
| S14 | −2.1003E−01 | 9.0867E−02 | −3.2993E−02 | 9.5224E−03 | −2.2099E−03 | 4.1257E−04 | −6.0364E−05 | 6.7031E−06 | −5.4999E−07 |

Figure 8A:
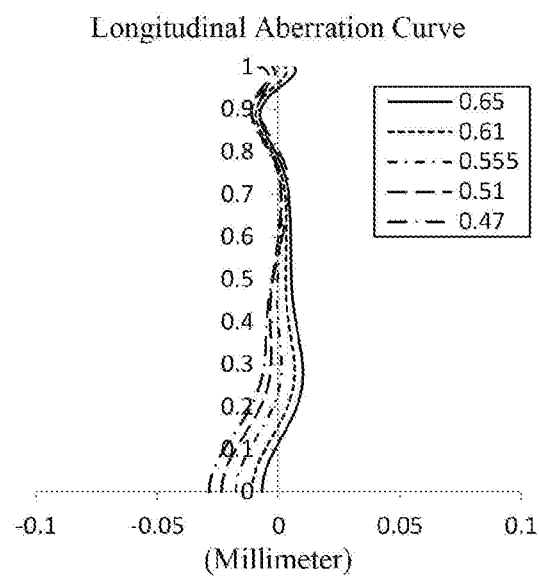
FIGS. 8A to 8D illustrate a longitudinal aberration curve, an astigmatic curve, a distortion curve, and a lateral color curve of the optical imaging lens assembly of the Example 4, respectively.
Figure 8B:
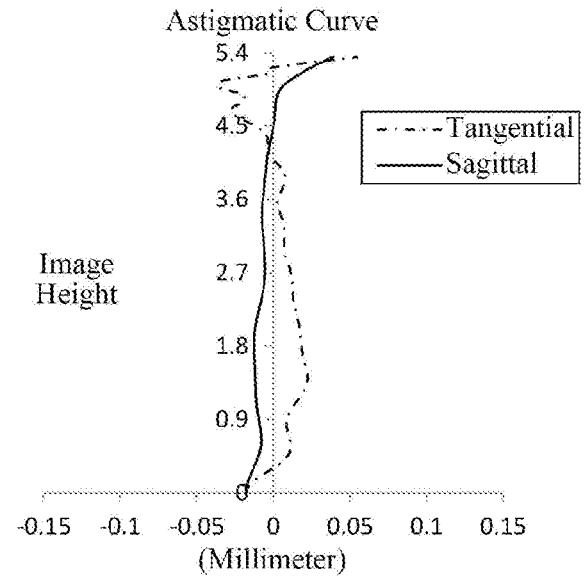
Figure 8C:
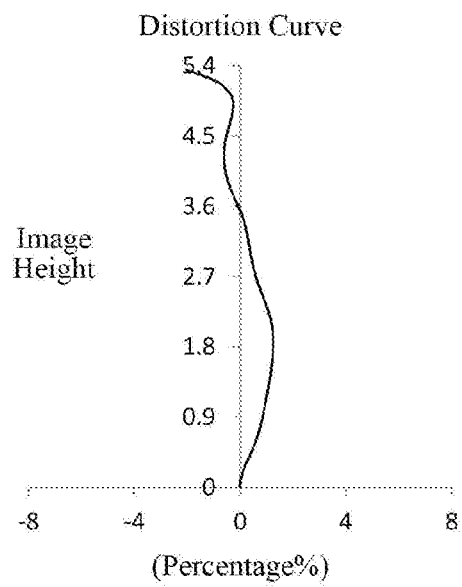
Figure 8D:
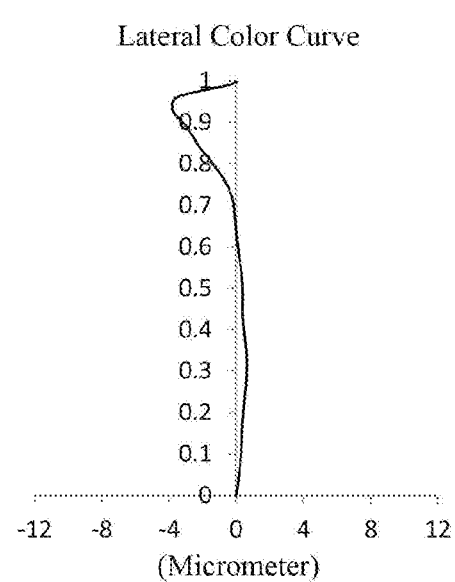

FIG. 8A illustrates a longitudinal aberration curve of the optical imaging lens assembly according to Example 4, representing deviations of focal points converged by light of different wavelengths after passing through the lens assembly. FIG. 8B illustrates an astigmatic curve of the optical imaging lens assembly according to Example 4, representing a curvature of a tangential plane and a curvature of a sagittal plane. FIG. 8C illustrates a distortion curve of the optical imaging lens assembly according to Example 4, representing amounts of distortion corresponding to different image heights. FIG. 8D illustrates a lateral color curve of the optical imaging lens assembly according to Example 4, representing deviations of different image heights on an imaging plane after light passes through the lens assembly. It can be seen from FIG. 8A to FIG. 8D that the optical imaging lens assembly provided in Example 4 may achieve good image quality.

Example 5

An optical imaging lens assembly according to Example 5 of the present disclosure is described below with reference to FIG. 9 to FIG. 10D. FIG. 9 shows a schematic structural view of the optical imaging lens assembly according to Example 5 of the present disclosure.

As shown in FIG. 9, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In the present example, a total effective focal length f of the optical imaging lens assembly is 4.35 mm, a total length TTL of the optical imaging lens assembly is 6.84 mm, half of a diagonal length ImgH of an effective pixel area on the imaging plane S17 of the optical imaging lens assembly is 5.35 mm, half of a maximal field-of-view HFOV of the optical imaging lens assembly is 50.91°, and an F-number Fno of the optical imaging lens assembly is 1.86.

Table 9 is a table illustrating basic parameters of the optical imaging lens assembly of Example 5, wherein the units for the radius of curvature, the thickness/distance and the focal length are millimeter (mm). Table 10 shows high-order coefficients applicable to each aspheric surface in Example 5, wherein the surface shape of each aspheric surface may be defined by the formula (1) given in the above Example 1.

TABLE 9

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| S1 | Aspheric | −5.3813 | 0.3537 | 1.55 | 56.11 | −189.75 | 0.5902 |
| S2 | Aspheric | −5.8079 | 0.0400 | | | | 1.1064 |
| S3 | Aspheric | 2.2938 | 0.5172 | 1.55 | 56.11 | 8.60 | −2.6687 |
| S4 | Aspheric | 4.1271 | 0.2009 | | | | −5.2167 |
| STO | Spherical | Infinite | 0.2850 | | | | |
| S5 | Aspheric | 43.0535 | 0.7334 | 1.55 | 56.11 | 7.70 | 33.8755 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | −4.6315 | 0.2788 | | | | 2.2879 |
| S7 | Aspheric | −5.0886 | 0.3736 | 1.68 | 19.24 | −12.23 | 3.0867 |
| S8 | Aspheric | −13.5712 | 0.3471 | | | | 50.0022 |
| S9 | Aspheric | −4.0455 | 0.5628 | 1.57 | 37.32 | −9.68 | −0.6784 |
| S10 | Aspheric | −15.9169 | 0.0556 | | | | 4.5882 |
| S11 | Aspheric | 2.3330 | 0.6853 | 1.55 | 56.11 | 3.46 | −10.3141 |
| S12 | Aspheric | −8.9139 | 0.4819 | | | | −0.6000 |
| S13 | Aspheric | 2.7034 | 0.5665 | 1.54 | 55.87 | −4.87 | −16.7723 |
| S14 | Aspheric | 1.2317 | 0.5953 | | | | −1.0050 |
| S15 | Aspheric | Infinite | 0.2100 | 1.52 | 64.17 | | |
| S16 | Aspheric | Infinite | 0.5542 | | | | |
| S17 | Spherical | Infinite | Infinite | | | | |

TABLE 10

| Surface number | A4 | A6 | A8 | A10 | A12 | A14 | A16 | A18 | A20 |
|---|---|---|---|---|---|---|---|---|---|
| S1 | 5.3737E−02 | −2.3069E−02 | 1.1767E−02 | −3.8742E−03 | 5.3607E−04 | 1.1941E−04 | −6.5529E−05 | 1.0930E−05 | −6.6664E−07 |
| S2 | 6.0575E−02 | −3.4787E−02 | 2.8100E−02 | −1.5403E−02 | 4.8024E−03 | −3.4946E−04 | −2.6601E−04 | 8.4052E−05 | −7.8381E−06 |
| S3 | 3.6078E−03 | 2.5789E−02 | −9.6408E−02 | 1.8478E−01 | −2.1455E−01 | 1.5350E−01 | −6.6611E−02 | 1.6041E−02 | −1.6382E−03 |
| S4 | −2.6184E−02 | 3.1655E−03 | 3.1934E−02 | −9.4675E−02 | 1.2443E−01 | −9.1935E−02 | 3.7373E−02 | −7.0118E−03 | 3.0588E−04 |
| S5 | −1.9926E−02 | −1.3008E−02 | 9.3252E−03 | −6.5709E−03 | −2.0385E−02 | 5.0396E−02 | −5.1788E−02 | 2.5476E−02 | −4.9708E−03 |
| S6 | −5.2145E−02 | −3.8841E−02 | 1.0888E−01 | −2.0493E−01 | 2.5501E−01 | −2.0424E−01 | 9.9923E−02 | −2.7247E−02 | 3.1675E−03 |
| S7 | −9.6067E−02 | 1.8144E−02 | −1.2374E−01 | 2.8312E−01 | −3.2956E−01 | 2.4024E−01 | −1.1143E−01 | 2.9873E−02 | −3.4706E−03 |
| S8 | −2.3647E−02 | 6.5294E−03 | −5.0788E−02 | 7.7268E−02 | −5.9953E−02 | 2.8010E−02 | −8.0610E−03 | 1.3276E−03 | −9.4522E−05 |
| S9 | 3.8811E−02 | 5.3474E−02 | −9.8182E−02 | 8.0591E−02 | −4.1813E−02 | 1.4260E−02 | −3.1089E−03 | 3.9132E−04 | −2.1419E−05 |
| S10 | −1.3217E−01 | 8.5418E−02 | −3.7335E−02 | 1.2757E−02 | −3.3361E−03 | 6.3704E−04 | −8.2466E−05 | 6.4626E−06 | −2.3384E−07 |
| S11 | 7.5578E−02 | −7.2974E−02 | 5.3054E−02 | −2.3757E−02 | 1.9924E−02 | −2.3564E−03 | 1.8941E−03 | −3.4415E−04 | 4.4441E−05 |
| S12 | 2.1264E−01 | −1.3204E−01 | 5.0536E−02 | −1.8171E−02 | 7.0017E−03 | −2.4436E−03 | 6.5346E−04 | −1.2563E−04 | 1.7055E−05 |
| S13 | 1.6135E−02 | −1.0794E−01 | 9.4898E−02 | −5.0311E−02 | 1.7637E−02 | −4.2196E−03 | 7.0810E−04 | −8.4936E−05 | 7.3362E−06 |
| S14 | −1.9186E−01 | 7.6533E−02 | −2.6777E−02 | 7.6804E−03 | −1.7918E−03 | 3.3649E−04 | −4.9340E−05 | 5.4665E−06 | −4.4585E−07 |

FIG. 10A illustrates a longitudinal aberration curve of the optical imaging lens assembly according to Example 5, representing deviations of focal points converged by light of different wavelengths after passing through the lens assembly. FIG. 10B illustrates an astigmatic curve of the optical imaging lens assembly according to Example 5, representing a curvature of a tangential plane and a curvature of a sagittal plane. FIG. 10C illustrates a distortion curve of the optical imaging lens assembly according to Example 5, representing amounts of distortion corresponding to different image heights. FIG. 10D illustrates a lateral color curve of the optical imaging lens assembly according to Example 5, representing deviations of different image heights on an imaging plane after light passes through the lens assembly. It can be seen from FIG. 10A to FIG. 10D that the optical imaging lens assembly provided in Example 5 may achieve good image quality.

Example 6

An optical imaging lens assembly according to Example 6 of the present disclosure is described below with reference to FIG. 11 to FIG. 12D. FIG. 11 shows a schematic structural view of the optical imaging lens assembly according to Example 6 of the present disclosure.

As shown in FIG. 11, the optical imaging lens assembly includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has negative refractive power, an object-side surface S1 thereof is a concave surface, and an image-side surface S2 thereof is a convex surface. The second lens E2 has positive refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a convex surface, and an image-side surface S14 thereof is a concave surface. The optical filter E8 has an object-side surface S15 and an image-side surface S16. Light from an object sequentially passes through the respective surfaces S1 to S16 and is finally imaged on the imaging plane S17.

In the present example, a total effective focal length f of the optical imaging lens assembly is 3.96 mm, a total length TTL of the optical imaging lens assembly is 6.56 mm, half of a diagonal length ImgH of an effective pixel area on the imaging plane S17 of the optical imaging lens assembly is 5.35 mm, half of a maximal field-of-view HFOV of the optical imaging lens assembly is 53.64°, and an F-number Fno of the optical imaging lens assembly is 1.95.

Table 11 is a table illustrating basic parameters of the optical imaging lens assembly of Example 6, wherein the units for the radius of curvature, the thickness/distance and the focal length are millimeter (mm). Table 12 shows high-order coefficients applicable to each aspheric surface in Example 6, wherein the surface shape of each aspheric surface may be defined by the formula (1) given in the above Example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −4.7315 | 0.3495 | 1.55 | 56.11 | −73.61 | 0.3439 |
| S2 | Aspheric | −5.5029 | 0.1360 | | | | 0.6299 |
| S3 | Aspheric | 2.2468 | 0.4832 | 1.55 | 56.11 | 7.88 | −2.6924 |
| S4 | Aspheric | 4.3458 | 0.1518 | | | | −6.8291 |
| STO | Spherical | Infinite | 0.2505 | | | | |
| S5 | Aspheric | 89.5269 | 0.6745 | 1.55 | 56.11 | 6.45 | −99.0000 |
| S6 | Aspheric | −3.6583 | 0.2496 | | | | 4.3386 |
| S7 | Aspheric | −3.9161 | 0.3834 | 1.68 | 19.24 | −8.79 | 2.6287 |
| S8 | Aspheric | −11.8756 | 0.3875 | | | | 28.9295 |
| S9 | Aspheric | −3.5973 | 0.4457 | 1.57 | 37.32 | −9.42 | −1.1408 |
| S10 | Aspheric | −11.3840 | 0.0733 | | | | −25.9973 |
| S11 | Aspheric | 2.2256 | 0.6159 | 1.55 | 56.11 | 3.34 | −9.8864 |
| S12 | Aspheric | −9.1085 | 0.3345 | | | | 1.1427 |
| S13 | Aspheric | 2.2054 | 0.6231 | 1.54 | 55.87 | −5.97 | −9.9303 |
| S14 | Aspheric | 1.1773 | 0.6179 | | | | −1.0048 |
| S15 | Aspheric | Infinite | 0.2100 | 1.52 | 64.17 | | |
| S16 | Aspheric | Infinite | 0.5775 | | | | |
| S17 | Spherical | Infinite | Infinite | | | | |

TABLE 12

| Surface number | A4 | A6 | A8 | A10 | A12 | A14 | A16 | A18 | A20 |
|---|---|---|---|---|---|---|---|---|---|
| S1 | 5.5269E−02 | −2.2779E−02 | 1.1750E−02 | −4.8948E−03 | 1.5030E−03 | −2.9767E−04 | 3.1089E−05 | −6.7407E−07 | −9.7991E−08 |
| S2 | 6.7456E−02 | −4.3473E−02 | 3.6600E−02 | −2.3948E−02 | 1.1159E−02 | −3.3031E−03 | 5.3125E−04 | −2.7798E−05 | −1.6639E−06 |
| S3 | 1.3950E−02 | 4.4525E−02 | −2.3537E−01 | 5.3757E−01 | −7.3182E−01 | 6.1311E−01 | −3.1136E−01 | 8.7784E−02 | −1.0513E−02 |
| S4 | −1.4727E−02 | −5.1466E−02 | 3.2517E−01 | −1.1458E+00 | 2.3490E+00 | −2.9474E+00 | 2.2202E+00 | −9.2019E−01 | 1.6117E−01 |
| S5 | −2.3922E−02 | −3.4520E−02 | 3.2341E−02 | 6.7938E−02 | −4.3676E−01 | 8.4733E−01 | −8.4221E−01 | 4.2978E−01 | −8.9854E−02 |
| S6 | −6.4167E−02 | −1.0488E−02 | 4.3380E−02 | −9.3358E−02 | 1.1157E−01 | −7.1764E−02 | 1.8022E−02 | 2.0348E−03 | −1.4180E−03 |
| S7 | −1.3406E−01 | 1.2734E−01 | −4.3280E−01 | 9.3448E−01 | −1.2295E+00 | 1.0382E+00 | −5.4848E−01 | 1.6393E−01 | −2.0976E−02 |
| S8 | −4.4166E−02 | 4.0242E−02 | −8.1454E−02 | 9.2872E−02 | −6.1229E−02 | 2.3458E−02 | −4.7875E−03 | 3.6049E−04 | 1.6621E−05 |
| S9 | 3.7181E−02 | 6.0403E−02 | −1.0128E−01 | 8.0761E−02 | −4.1888E−02 | 1.4495E−02 | −3.2405E−03 | 4.2244E−04 | −2.4126E−05 |
| S10 | −1.7110E−01 | 1.3920E−01 | −8.9049E−02 | 4.9631E−02 | −2.0900E−02 | 5.9174E−03 | −1.0359E−03 | 1.0058E−04 | −4.1355E−06 |
| S11 | 6.6337E−02 | −3.8883E−02 | 1.1657E−02 | −1.0220E−02 | 8.1979E−03 | −3.8547E−03 | 1.1295E−03 | −2.1698E−04 | 2.7922E−05 |
| S12 | 2.1441E−01 | −1.0240E−01 | 8.0461E−03 | 1.0560E−02 | −4.9398E−03 | 8.5833E−04 | 2.6140E−05 | −4.2732E−05 | 9.4535E−06 |
| S13 | −6.1621E−04 | −7.7762E−02 | 7.0711E−02 | −3.8560E−02 | 1.3806E−02 | −3.3402E−03 | 5.6218E−04 | −6.7216E−05 | 5.7591E−06 |
| S14 | −2.0932E−01 | 9.7962E−02 | −4.2658E−02 | 1.5238E−02 | −4.2290E−03 | 8.8887E−04 | −1.3914E−04 | 1.6026E−05 | −1.3424E−06 |

Figure 12A:
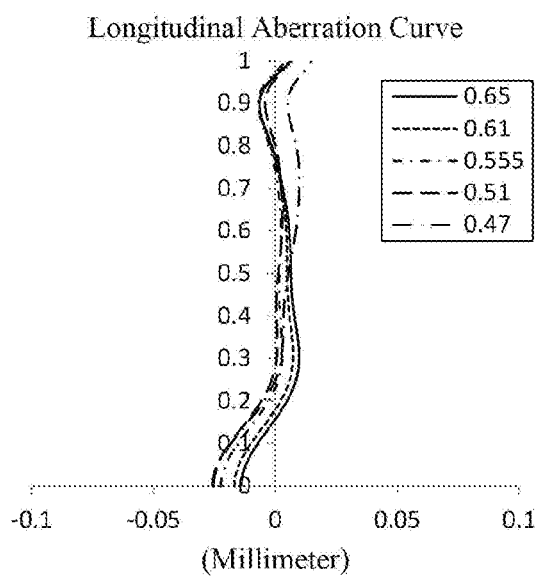
FIGS. 12A to 12D illustrate a longitudinal aberration curve, an astigmatic curve, a distortion curve, and a lateral color curve of the optical imaging lens assembly of the Example 6, respectively.
Figure 12B:
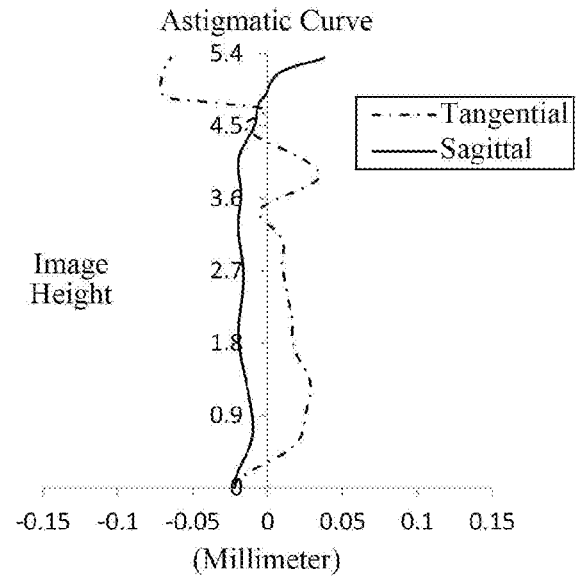
Figure 12C:
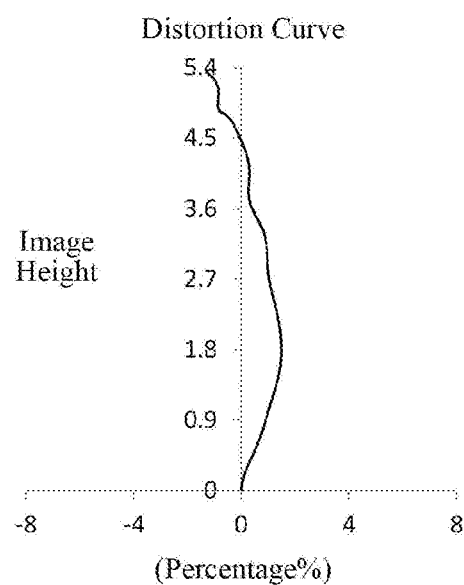
Figure 12D:
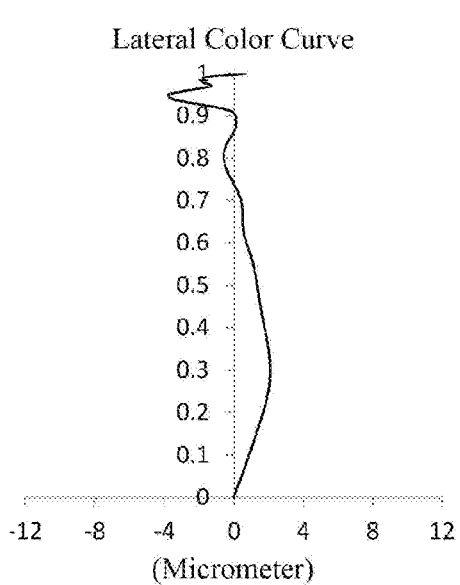

FIG. 12A illustrates a longitudinal aberration curve of the optical imaging lens assembly according to Example 6, representing deviations of focal points converged by light of different wavelengths after passing through the lens assembly. FIG. 12B illustrates an astigmatic curve of the optical imaging lens assembly according to Example 6, representing a curvature of a tangential plane and a curvature of a sagittal plane. FIG. 12C illustrates a distortion curve of the optical imaging lens assembly according to Example 6, representing amounts of distortion corresponding to different image heights. FIG. 12D illustrates a lateral color curve of the optical imaging lens assembly according to Example 6, representing deviations of different image heights on an imaging plane after light passes through the lens assembly. It can be seen from FIG. 12A to FIG. 12D that the optical imaging lens assembly provided in Example 6 may achieve good image quality.

In view of the above, Examples 1 to 6 respectively satisfy the relationship shown in Table 13.

TABLE 13

| | Example | | | | | |
|---|---|---|---|---|---|---|
| Conditional | 1 | 2 | 3 | 4 | 5 | 6 |
| f3/f | 1.85 | 2.00 | 1.70 | 1.84 | 1.77 | 1.63 |
| SAG42/SAG41 | 0.59 | 0.64 | 0.48 | 0.65 | 0.66 | 0.62 |
| f/(R1 + R2) | −0.30 | −0.37 | −0.37 | −0.51 | −0.39 | −0.39 |
| f6/f | 0.88 | 1.29 | 0.98 | 0.73 | 0.80 | 0.84 |
| R9/f5 | 0.40 | 0.09 | 0.40 | 0.60 | 0.42 | 0.38 |
| (T12 + T56) × TTL (mm$^2$) | 0.58 | 0.97 | 0.97 | 0.85 | 0.65 | 1.37 |
| CT3/CT6 | 1.01 | 1.10 | 1.08 | 0.96 | 1.07 | 1.10 |
| f12/f | 1.81 | 1.90 | 2.29 | 1.88 | 2.02 | 2.17 |
| |ODT| (mm) | 3.52 | 1.80 | 2.30 | 2.01 | 1.49 | 1.49 |
| TTL/ImgH | 1.28 | 1.28 | 1.26 | 1.28 | 1.28 | 1.23 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
a first lens having refractive power, an object-side surface of the first lens is a concave surface, and an image-side surface of the first lens is a convex surface;
a second lens having refractive power;
a third lens having refractive power;
a fourth lens having refractive power;
a fifth lens having negative refractive power, and an object-side surface of the fifth lens is a concave surface;
a sixth lens having positive refractive power; and
a seventh lens having refractive power,
wherein f3/f>1.49, where f is a total effective focal length of the optical imaging lens assembly, and f3 is an effective focal length of the third lens.

2. The optical imaging lens assembly according to claim 1, wherein |ODT|≤3.52 mm,
where ODT is an optical distortion of the optical imaging lens assembly.

3. The optical imaging lens assembly according to claim 1, wherein TTL/ImgH<1.47,
where TTL is a distance along the optical axis from the object-side surface of the first lens to an imaging plane of the optical imaging lens assembly, and ImgH is half of a diagonal length of an effective pixel area on the imaging plane of the optical imaging lens assembly.

4. The optical imaging lens assembly according to claim 1, wherein 0<R9/f5≤0.6,
where R9 is a radius of curvature of the object-side surface of the fifth lens, and f5 is an effective focal length of the fifth lens.

5. The optical imaging lens assembly according to claim 1, wherein 0.6<f6/f≤1.29,
where f is the total effective focal length of the optical imaging lens assembly, and f6 is an effective focal length of the sixth lens.

6. The optical imaging lens assembly according to claim 1, wherein 0.1<SAG42/SAG41<0.9,
where SAG41 is a distance along the optical axis from an intersection of an object-side surface of the fourth lens and the optical axis to a vertex of an effective radius of the object-side surface of the fourth lens, and SAG42 is a distance along the optical axis from an intersection of an image-side surface of the fourth lens and the optical axis to a vertex of an effective radius of the image-side surface of the fourth lens.

7. The optical imaging lens assembly according to claim 1, wherein 0.7<CT3/CT6<1.3,
where CT3 is a center thickness of the third lens, and CT6 is a center thickness of the sixth lens.

8. The optical imaging lens assembly according to claim 1, wherein 0.2 mm$^2$<(T12+T56)*TTL≤1.37 mm$^2$,
where T12 is a spaced interval between the first lens and the second lens along the optical axis, T56 is a spaced interval between the fifth lens and the sixth lens along the optical axis, and TTL is a distance along the optical axis from the object-side surface of the first lens to an imaging plane of the optical imaging lens assembly.

9. The optical imaging lens assembly according to claim 1, wherein f/EPD<2,
where f is the total effective focal length of the optical imaging lens assembly, and EPD is an entrance pupil diameter of the optical imaging lens assembly.

10. The optical imaging lens assembly according to claim 1, wherein −1<f/(R1+R2)<0,
where f is the total effective focal length of the optical imaging lens assembly, R1 is a radius of curvature of the object-side surface of the first lens, and R2 is a radius of curvature of the image-side surface of the first lens.

11. The optical imaging lens assembly according to claim 1, wherein $1.5 < f12/f < 2.5$,
where f12 is a combined focal length of the first lens and the second lens, and f is the total effective focal length of the optical imaging lens assembly.

12. The optical imaging lens assembly according to claim 1, wherein $HFOV > 45°$,
where HFOV is half of a maximal field-of-view of the optical imaging lens assembly.

13. The optical imaging lens assembly according to claim 1,
wherein $|ODT| \leq 3.52$ mm, where ODT is an optical distortion of the optical imaging lens assembly, and
$TTL/ImgH < 1.47$, where TTL is a distance along the optical axis from the object-side surface of the first lens to an imaging plane of the optical imaging lens assembly, and ImgH is half of a diagonal length of an effective pixel area on the imaging plane of the optical imaging lens assembly.

14. The optical imaging lens assembly according to claim 13, wherein $0 < R9/f5 \leq 0.6$,
where R9 is a radius of curvature of the object-side surface of the fifth lens, and f5 is an effective focal length of the fifth lens.

15. The optical imaging lens assembly according to claim 13, wherein $0.6 < f6/f \leq 1.29$,
where f is a total effective focal length of the optical imaging lens assembly, and f6 is an effective focal length of the sixth lens.

16. The optical imaging lens assembly according to claim 13, wherein $0.1 < SAG42/SAG41 < 0.9$,
where SAG41 is a distance along the optical axis from an intersection of an object-side surface of the fourth lens and the optical axis to a vertex of an effective radius of the object-side surface of the fourth lens, and SAG42 is a distance along the optical axis from an intersection of an image-side surface of the fourth lens and the optical axis to a vertex of an effective radius of the image-side surface of the fourth lens.

17. The optical imaging lens assembly according to claim 13, wherein $0.2$ mm$^2 < (T12+T56)*TTL \leq 1.37$ mm$^2$,
where T12 is a spaced interval between the first lens and the second lens along the optical axis, T56 is a spaced interval between the fifth lens and the sixth lens along the optical axis, and TTL is the distance along the optical axis from the object-side surface of the first lens to the imaging plane of the optical imaging lens assembly.

18. The optical imaging lens assembly according to claim 13, wherein $f/EPD < 2$,
where f is a total effective focal length of the optical imaging lens assembly, and EPD is an entrance pupil diameter of the optical imaging lens assembly.

19. The optical imaging lens assembly according to claim 13, wherein $-1 < f/(R1+R2) < 0$,
where f is a total effective focal length of the optical imaging lens assembly, R1 is a radius of curvature of the object-side surface of the first lens, and R2 is a radius of curvature of the image-side surface of the first lens.

20. The optical imaging lens assembly according to claim 13, wherein $1.5 < f12/f < 2.5$,
where f12 is a combined focal length of the first lens and the second lens, and f is a total effective focal length of the optical imaging lens assembly.

* * * * *